US011144155B2

(12) United States Patent
Lin et al.

(10) Patent No.: US 11,144,155 B2
(45) Date of Patent: Oct. 12, 2021

(54) ELECTRONIC DEVICE

(71) Applicant: ASUSTeK COMPUTER INC., Taipei (TW)

(72) Inventors: Yu-Sheng Lin, Taipei (TW); Kuan-Hsin Lee, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/684,790

(22) Filed: Nov. 15, 2019

(65) Prior Publication Data

US 2020/0174615 A1 Jun. 4, 2020

(30) Foreign Application Priority Data

Nov. 30, 2018 (TW) .................................. 107216377

(51) Int. Cl.
*G06F 3/041* (2006.01)

(52) U.S. Cl.
CPC .................................. *G06F 3/0416* (2013.01)

(58) Field of Classification Search
CPC ............................. G06F 1/1692; G06F 3/0416
See application file for complete search history.

(56) References Cited

U.S. PATENT DOCUMENTS

| | | | | |
|---|---|---|---|---|
| 10,318,034 | B1* | 6/2019 | Hauenstein | G06F 3/04883 |
| 2011/0157014 | A1* | 6/2011 | Hachiya | G06F 3/0486 |
| | | | | 345/157 |
| 2012/0036294 | A1* | 2/2012 | Lee | G06F 13/4081 |
| | | | | 710/63 |
| 2012/0075204 | A1* | 3/2012 | Murray | G06F 9/452 |
| | | | | 345/173 |
| 2013/0033435 | A1* | 2/2013 | Raveendran | G06F 3/0481 |
| | | | | 345/173 |
| 2013/0120458 | A1* | 5/2013 | Celebisoy | G06F 3/147 |
| | | | | 345/649 |
| 2014/0185222 | A1 | 7/2014 | Hung et al. | |
| 2015/0301633 | A1* | 10/2015 | Nakamura | G06F 3/041 |
| | | | | 345/173 |
| 2016/0187997 | A1* | 6/2016 | Gao | G06F 3/0482 |
| | | | | 715/771 |

FOREIGN PATENT DOCUMENTS

| | | |
|---|---|---|
| CN | 202159383 U | 3/2012 |
| CN | 202720505 U | 2/2013 |
| CN | 103167116 A | 6/2013 |
| CN | 106101770 A | 11/2016 |
| CN | 103902195 B | 2/2017 |

* cited by examiner

*Primary Examiner* — Dong Hui Liang
(74) *Attorney, Agent, or Firm* — McClure, Qualey & Rodack, LLP

(57) ABSTRACT

An electronic device adapted to connect to an external device is provided. The electronic device includes an input/output module, a control module, and a touch screen. The control module is electrically connected to the input/output module, and the control module is configured to send a request signal through the input/output module and receive set information corresponding to the request signal through the input/output module. The touch screen is electrically connected to the control module. When the touch screen generates a touch signal in response to a touch behavior, the control module converts the touch signal to a control signal based on the set information, and sends the control signal through the input/output module.

11 Claims, 7 Drawing Sheets ated by the external device 300. The transmission cable 310 is, for example, a universal serial bus (USB) cable.
ELECTRONIC DEVICE

CROSS-REFERENCE TO RELATED APPLICATION

This application claims the priority benefit of Taiwan Application Serial No. 107216377, filed on Nov. 30, 2018. The entirety of the above-mentioned patent application is hereby incorporated by reference herein and made a part of the specification.

BACKGROUND OF THE INVENTION

Field of the Invention

The disclosure relates to a display device.

Description of the Related Art

Existing external touch screens are adapted to connect to portable electronic devices or desktop computers, so that users operate the portable electronic devices or desktop computers through the external touch screens. However, specifications of different portable electronic devices or desktop computers (including aspect ratios of touch panels and image formats) vary. The existing external touch screens do not support the specifications of various portable electronic devices or desktop computers at the same time, and consequently, the external touch screens fail to correctly display pictures of the portable electronic devices or desktop computers. As a result, when the user operates the portable electronic device or desktop computer through the external touch screen, the touch position on the portable electronic device or desktop computer does not correctly correspond to the external touch screen, resulting in an incorrect operation.

BRIEF SUMMARY OF THE INVENTION

According to the first aspect of the disclosure, an electronic device is provided. The electronic device adapted to connect to an external device includes: an input/output module; a control module, electrically connected with the input/output module, wherein the control module is configured to output a request signal through the input/output module and receive set information corresponding to the request signal through the input/output module; and a touch screen, electrically connected with the control module, wherein when the touch screen generates a touch signal in response to a touch behavior, the control module converts the touch signal to a control signal based on the set information, and outputs the control signal through the input/output module.

Based on the above, when the electronic device of the disclosure is connected to an external device, the electronic device automatically analyzes touch information and an image specification of the connected external device, and generates corresponding conversion information, to enable the touch screen of the electronic device to correctly correspond to a touch screen of the external device. Therefore, a position that a user touches on the electronic device correctly corresponds to the external device, thereby avoiding incorrect operations.

The detailed descriptions of other effects and embodiments of the disclosure are provided below with reference to the accompanying drawings.

BRIEF DESCRIPTION OF THE DRAWINGS

To more clearly describe the technical solutions in the embodiments of the disclosure or in the prior art, the following will briefly introduce the drawings required for describing the embodiments or the prior art. It is apparent that the drawings in the following description are only some embodiments described in the disclosure, and a person of ordinary skill in the art obtains other drawings on the basis of these drawings without any creative effort.

DETAILED DESCRIPTION OF THE EMBODIMENTS

Unless otherwise particularly specified, the positional relationships described in the following embodiments, including upper, lower, left and right, are based on the directions in which the components are depicted in the figures.

Figure 1:
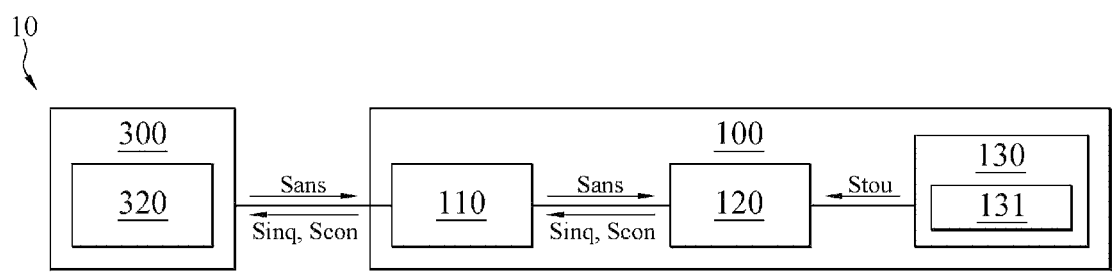
FIG. 1 is a schematic block diagram of an electronic device and a control system according to a first embodiment of the disclosure.
Figure 2:
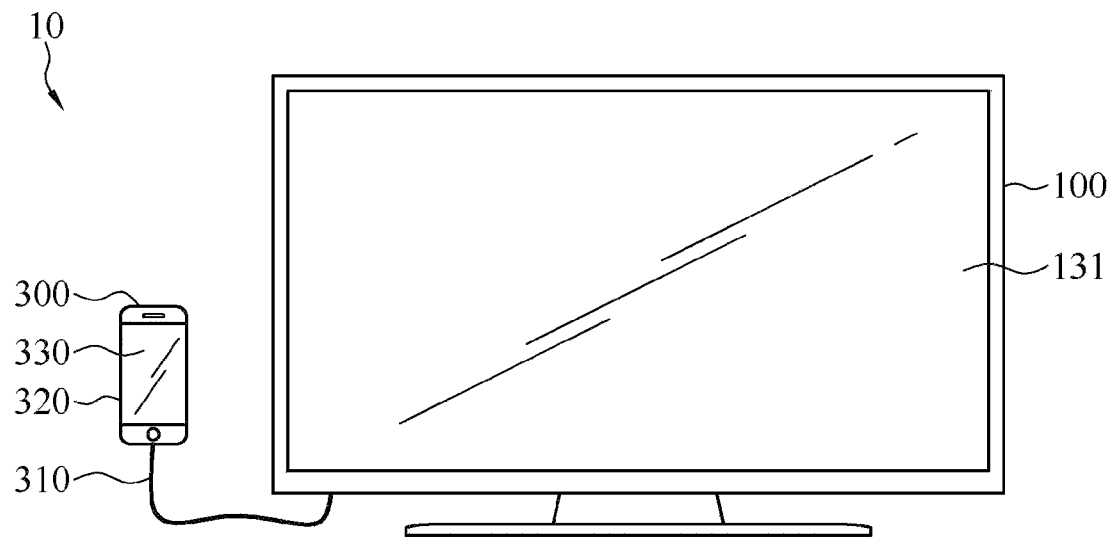
FIG. 2 is a schematic diagram of the electronic device and the control system in FIG. 1.

Referring to FIG. 1 and FIG. 2, in this embodiment, an electronic device 100 is a touch display, and an external device 300 is a smart phone. In other embodiments, the external device 300 is a portable electronic device or a desktop electronic device. The electronic device 100 is connected to the external device 300 through a transmission cable 310, and a user operates and controls the external device 300 by the electronic device 100.

As shown in FIG. 1 and FIG. 2, in this embodiment, the electronic device 100 includes an input/output module 110, a control module 120, and a touch screen 130. The control module 120 is electrically connected with the input/output module 110, and the touch screen 130 is electrically connected with the control module 120. In this embodiment, the input/output module 110 is a universal serial bus hub (USB Hub), the control module 120 is an integrated micro control unit (MCU) or a processing chip of a touch controller, and the transmission cable 310 is a USB transmission cable. In other embodiments, the control module 120 is a collective name for independent processing chips having different functions. As shown in FIG. 2, in this embodiment, an end of the transmission cable 310 is connected with the electronic device 100, the other end of the transmission cable 310 is connected with the external device 300. The electronic device 100 and the external device 300 transmit signals to each other through the transmission cable 310.

As shown in FIG. 1, in this embodiment, the control module 120 is configured to control the electronic device 100 to display an image based on an image signal, and performs a touch operation function based on a touch signal Stou. When the external device 300 is connected with the electronic device 100, the control module 120 is informed that the electronic device 100 has been connected to the external device 300 by a connection signal. In this case, the control module 120 correspondingly generates a request signal Sinq, and outputs the request signal Sinq to the external device 300 through the input/output module 110. In an embodiment, the request signal Sinq is used to request the external device 300 to return set information Sans including touch information and an image specification.

When receiving the request signal Sinq, the external device 300 generates corresponding set information Sans based on the request signal Sinq, and returns the set information Sans to the electronic device 100. The control module 120 receives the set information from the external device 300 through the input/output module 110, and analyzes the set information Sans, to determine the touch information and the image specification of the external device 300. When the touch screen 130 generates a touch signal Stou in response to a touch behavior, the control module 120 converts the touch signal Stou to a control signal Scon based on the set information Sans, and outputs the control signal Scon to the external device 300 through the input/output module 110, to control the external device 300.

When receiving the control signal Scon, the external device 300 performs a corresponding touch operation function based on the control signal Scon. In other words, a touch behavior of a user on the touch screen 130 of the electronic device 100 causes the external device 300 to perform a corresponding touch operation function.

In an embodiment, the set information Sans includes the touch information and the image specification. The external device 300 generates the corresponding set information Sans based on the request signal Sinq without installing additional software or hardware. In an embodiment, the external device 300 is a smart phone using an Android operating system, and the request signal Sinq includes an instruction that complies with a programming language for Android. When receiving the request signal Sinq, the smart phone generates set information Sans including touch information and an image specification of the smart phone. In an embodiment, the touch information includes specification information of a touch screen of the external device 300 and position information of a touch interface displayed on the touch screen of the external device 300. In an embodiment, the image specification includes information such as an image resolution, an image aspect ratio, a display coordinate system, or an image mode displayed by the external device 300. In this embodiment, the image mode includes a vertical mode (such as a portrait mode) or a horizontal mode (such as a landscape mode).

As shown in FIG. 1 and FIG. 2, in this embodiment, the touch screen 130 of the electronic device 100 includes a touch display area 131 configured to display an image, and a touch screen 320 of the external device 300 includes a display area 330 configured to display an image. As shown in FIG. 1 and FIG. 2, because the touch screen 130 includes the touch display area 131, the touch screen 130 generates a touch signal Stou when the user touches the touch display area 131. The control module 120 proportionally enlarges and maps an initial image displayed in the display area 330 to an adjusted image displayed in the touch display area 131 of the electronic device 100, and the control module 120 converts first coordinate information applicable to the touch screen 130 of the electronic device 100 to second coordinate information applicable to the touch screen 320 of the external device 300 based on the set information Sans.

In an embodiment, when the user touches a particular position on the touch screen 130 of the electronic device 100, the touch screen 130 generates a corresponding touch signal Stou. The touch signal Stou includes first coordinate information of the touched position on the touch screen 130, and the control module 120 converts the first coordinate information to the second coordinate information applicable to the external device 300 based on the set information Sans. A control signal Scon generated by the control module 120 based on the set information Sans includes the second coordinate information. The electronic device 100 transmits the control signal Scon to the external device 300, and the external device 300 performs a touch operation function corresponding to the second coordinate information based on the control signal Scon.

Figure 10:
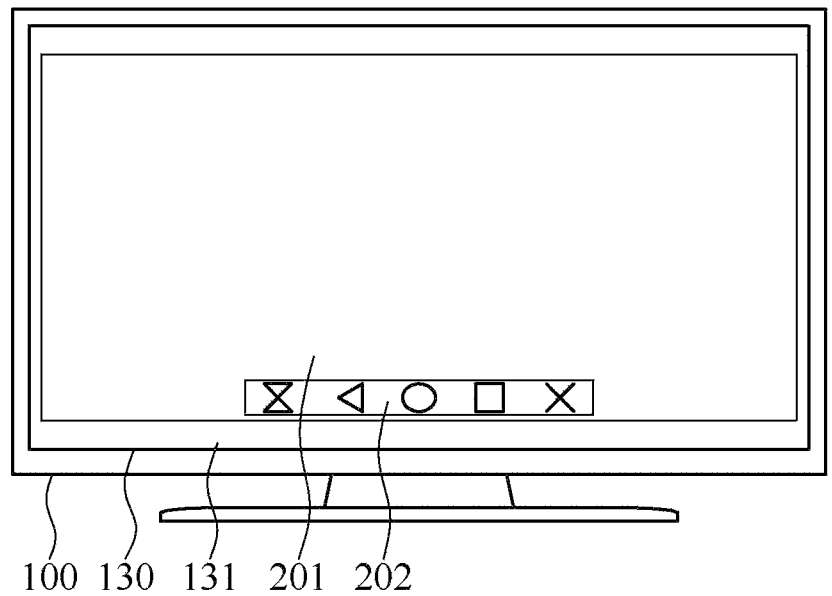
FIG. 10 is a schematic diagram of an implementation aspect of an adjusted image and a virtual-key image displayed in a touch display area in FIG. 9.

Referring to FIG. 1 and FIG. 10, in another embodiment, when coordinates are measured in pixels, a resolution of the display area 330 of the external device 300 is 1920×1080 (that is, a height-direction coordinate of the display area 330 is 0 to 1080, and a length-direction coordinate of the display area 330 is 0 to 1920); and a resolution of the touch display area 131 of the electronic device 100 is 1920×1440 (that is, a height-direction coordinate of the touch display area 131 is 0 to 1920, and a length-direction coordinate of the touch display area 131 is 0 to 1440). In this embodiment, a resolution in a length direction of the display area 330 is the same as a resolution in a length direction of the touch display area 131. Therefore, when the electronic device 100 proportionally enlarges and maps an initial image of the external device 300 to an adjusted image 201 displayed in the touch display area 131 (as shown in FIG. 10), length-direction coordinates of the touch display area 131 correspond one by one to length-direction coordinates of the display area 330 of the external device 300. However, because a resolution in a height direction of the display area 330 is different from a resolution in a height direction of the touch display area 131, the electronic device 100 converts the initial image of the external device 300 to the adjusted image 201 based on a preset setting or user setting and displays the adjusted image 201 in a middle part of the touch display area 131 in the height direction. In addition, no image is displayed in upper and lower parts of the touch display area 131 in the height direction. In an embodiment, the electronic device 100 displays an image of the external device 300 within a range of height-direction coordinates of the touch display area 131 from 160 to 1240 (that is, the height-direction coordinates of 0 to 1080 of the display area 330 of the external device 300 correspond to height-direction coordinates of 160 to 1240 of the touch display area 131 of the electronic device 100). In other words, a height-direction coordinate in the first coordinate information of the electronic device 100 minus 160 is equal to a height-direction coordinate in the second coordinate information of the external device 300.

In an embodiment, an initial image being displayed on the external device 300 is one of pages of an Android operating system assembly, a plurality of application icons are arranged in a matrix form and displayed in the page of an Android operating system assembly. The electronic device 100 converts the initial image displayed on the external device 300 to an adjusted image and displays the adjusted image in the touch display area 131. When a user touches an icon of an application "Google album" in the adjusted image of the touch display area 131, a "Google album" function of the external device 300 is triggered. It is assumed that a position the user touches is at a length-direction coordinate of 300 and a height-direction coordinate of 500 of the touch display area 131, that is, the first coordinate information is (300, 500). In this case, the touch screen 130 generates a corresponding touch signal Stou, and the touch signal Stou includes the first coordinate information (300, 500). However, the first coordinate information (300, 500) is not a position of an icon of the application "Google album" on the external device 300. Consequently, if the electronic device 100 directly transmits the touch signal Stou to the external device 300, the external device 300 will perform an incorrect or invalid touch operation based on the touch signal Stou. Therefore, the control module 120 first converts the first coordinate information (300, 500) to second coordinate information (300, 340) based on the set information Sans, where the second coordinate information (300, 340) is the position of the icon of the application "Google album" on the external device 300. The control module 120 transmits a control signal Scon including the second coordinate information (300, 340) to the external device 300, to cause the external device 300 to perform a touch operation function corresponding to the second coordinate information (300, 340).

Figure 3:
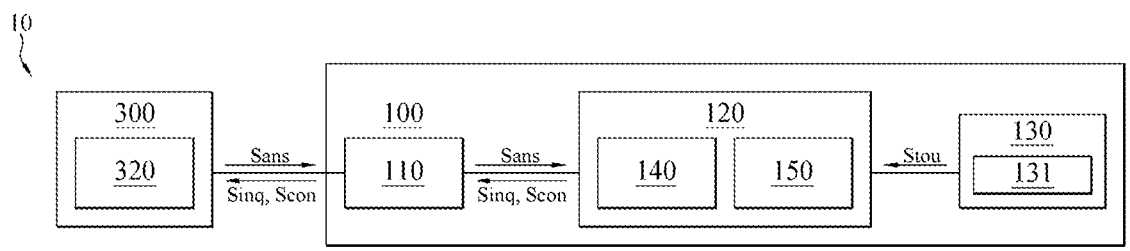
FIG. 3 is a schematic block diagram of an electronic device and a control system according to a second embodiment of the disclosure.

Referring to FIG. 3, the main difference between an electronic device 100 in FIG. 3 and the electronic device 100 in FIG. 1 is the control module 120. For other same or similar components and connection relationships thereof, reference is made to the foregoing embodiments, and details will not be described herein again. In this embodiment, the control module 120 further includes a primary controller 140 and a touch controller 150. In an embodiment, the primary controller 140 is a control chip, such as an MCU chip, a system-on-chip (SOC), or a scaler chip, configured to control and process an internal signal of the electronic device 100, and the touch controller 150 is a control chip configured to control and process the touch signal Stou of the touch screen 130. The primary controller 140 and the touch controller 150 are independent chips, or are a plurality of chip cores integrated on a same chip substrate. The primary controller 140 is electrically connected to the touch controller 150 and the input/output module 110, and the touch controller 150 is electrically connected to the touch screen 130. In this embodiment, when the control module 120 is informed that the electronic device 100 has been connected to an external device 300 by a connection signal, the primary controller 140 correspondingly generates a request signal Sinq. When a user touches a particular position on the touch screen 130 of the electronic device 100, the touch screen 130 generates the corresponding touch signal Stou, and the touch controller 150 converts the touch signal Stou to a control signal Scon.

Figure 4:
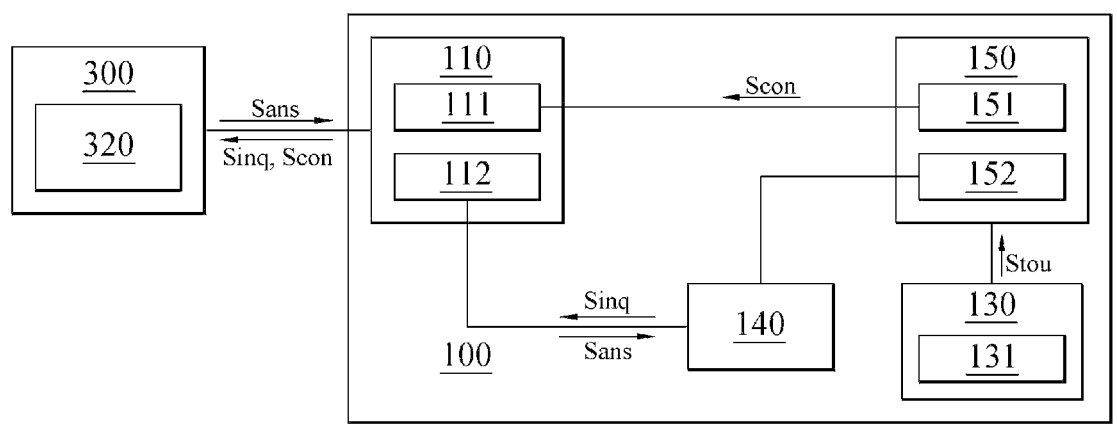
FIG. 4 is a schematic block diagram of an electronic device and a control system according to a third embodiment of the disclosure.

Referring to FIG. 4, the main difference between an electronic device 100 in FIG. 4 and the electronic device 100 in FIG. 3 is that the primary controller 140 and the touch controller 150 in FIG. 4 are implemented as two independent components. For other same or similar components and connection relationships thereof, reference is made to the foregoing embodiments, and details will not be described herein again. In this embodiment, the primary controller 140 and the touch controller 150 are independent chips. The input/output module 110 includes a first input/output interface 111 and a second input/output interface 112, and the touch controller 150 includes a first touch control interface 151 and a second touch control interface 152. The first input/output interface 111 is connected to the first touch control interface 151, and the primary controller 140 is connected to the second input/output interface 112 and the second touch control interface 152. When the electronic device 100 is connected to an external device 300, the primary controller 140 transmits a request signal Sinq to the external device 300 through the second input/output interface 112, and receives set information Sans from the external device 300 through the second input/output interface 112, and the primary controller 140 sets, through the second touch control interface 152, the touch controller 150 to enable the touch controller 150 to correspondingly convert first coordinate information to second coordinate information. The touch controller 150 transmits a control signal Scon to the external device 300 through the first touch control interface 151 and the first input/output interface 111. In this embodiment, because the input/output module 110 and the touch controller 150 each include two internal interfaces, the input/output module 110, the primary controller 140, and the touch controller 150 transmit signals to each other without using any path switcher and do not interfere with each other. In different embodiments, the input/output module 110 and the touch controller 150 each include three or more internal interfaces.

Figure 5:
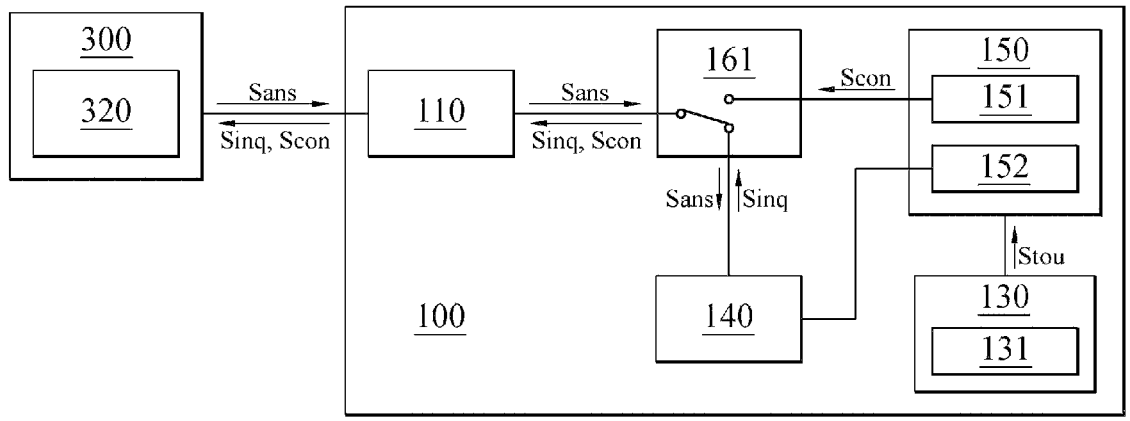
FIG. 5 is a schematic block diagram of an electronic device and a control system according to a fourth embodiment of the disclosure.

Referring to FIG. 5, the main difference between an electronic device 100 in FIG. 5 and the electronic device 100 in FIG. 4 is that the electronic device 100 in FIG. 5 further includes a front path switcher 161. For other same or similar components and connection relationships thereof, reference is made to the foregoing embodiments, and details will not be described herein again. In this embodiments, the input/output module 110 is connected with the front path switcher 161. Therefore, the input/output module 110 includes only a single internal interface, and the input/output module 110 is connected with the primary controller 140 and the touch controller 150 through the front path switcher 161. The touch controller 150 includes a first touch control interface 151 and a second touch control interface 152, the front path switcher 161 selectively connects the input/output module 110 to the first touch control interface 151 or the primary controller 140, and the primary controller 140 connects to the second touch control interface 152. When the electronic device 100 is connected to an external device 300, the front path switcher 161 first switches to connect the input/output module 110 to the primary controller 140, and the primary controller 140 transmits a request signal Sinq to the input/output module 110 through the front path switcher 161, and receives set information Sans from the input/output module 110 through the front path switcher 161. The primary controller 140 sets the touch controller 150 through the second touch control interface 152. Then, the front path switcher 161 switches to connect the input/output module 110 to the first touch control interface 151, and the touch controller 150 transmits a control signal Scon to the input/output module 110 through the first touch control interface 151 and the front path switcher 161.

Figure 6:
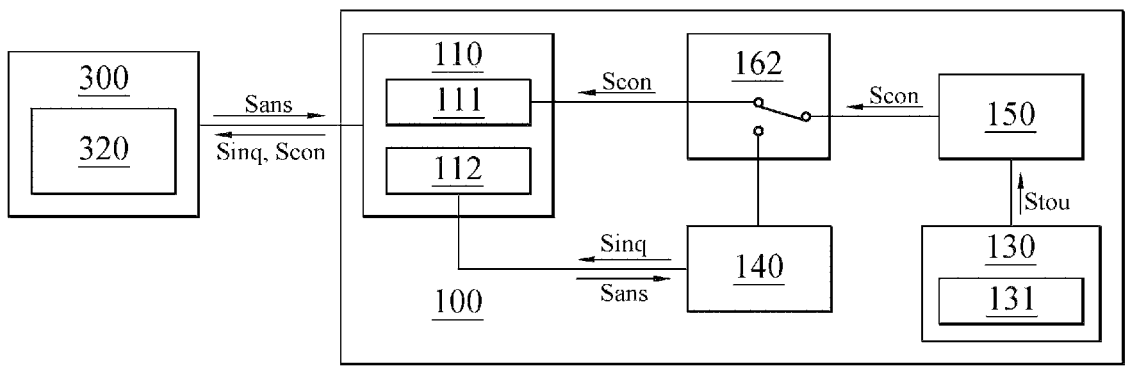
FIG. 6 is a schematic block diagram of an electronic device and a control system according to a fifth embodiment of the disclosure.

Referring to FIG. 6, the main difference between an electronic device 100 in FIG. 6 and the electronic device 100 in FIG. 4 is that the electronic device 100 in FIG. 6 further includes a back path switcher 162. For other same or similar components and connection relationships thereof, reference is made to the foregoing embodiments, and details will not be described herein again. In this embodiment, the touch controller 150 is connected to the back path switcher 162. Therefore, the touch controller 150 includes only a single internal interface, and the touch controller 150 connects to the primary controller 140 and the input/output module 110 through the back path switcher 162. The input/output module 110 includes a first input/output interface 111 and a second input/output interface 112, the back path switcher 162 selectively connects the touch controller 150 to the first input/output interface 111 or the primary controller 140, and the primary controller 140 connects to the second input/output interface 112. When the electronic device 100 is connected to an external device 300, the back path switcher 162 first switches to connect the touch controller 150 to the primary controller 140, and the primary controller 140 transmits a request signal Sinq to the external device 300 through the second input/output interface 112, receives set information Sans from the external device 300 through the second input/output interface 112, and sets the touch controller 150 through the back path switcher 162. Then, the back path switcher 162 switches to connect the first input/output interface 111 to the touch controller 150, and the touch controller 150 transmits a control signal Scon to the first input/output interface 111 through the back path switcher 162, and then transmits a control signal Scon to the external device 300 through the first input/output interface 111.

Figure 7:
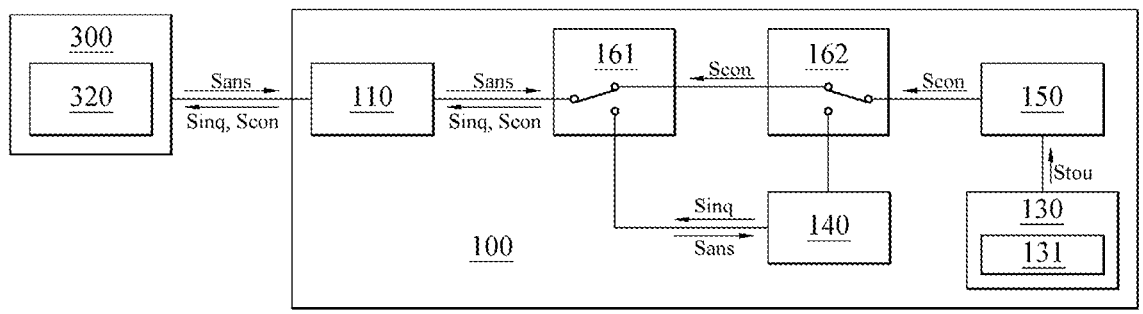
FIG. 7 is a schematic block diagram of an electronic device and a control system according to a sixth embodiment of the disclosure.

Referring to FIG. 7, the main difference between an electronic device 100 in FIG. 7 and the electronic device 100 in FIG. 4 is that the electronic device 100 in FIG. 7 further includes a front path switcher 161 and a back path switcher 162. For other same or similar components and connection relationships thereof, reference is made to the foregoing embodiments, and details will not be described herein again. In this embodiment, the input/output module 110 is connected to the front path switcher 161, the touch controller 150 is connected to the back path switcher 162, and the front path switcher 161 is electrically connected to the back path switcher 162. Therefore, the input/output module 110 and the touch controller 150 each include a single internal interface. The front path switcher 161 selectively connects the input/output module 110 to the back path switcher 162 or the primary controller 140, and the back path switcher 162 selectively connects the touch controller 150 to the front path switcher 161 or the primary controller 140. When the electronic device 100 is connected to an external device 300, the front path switcher 161 first switches to connect the input/output module 110 to the primary controller 140, and the back path switcher 162 first switches to connect the touch controller 150 to the primary controller 140. The primary controller 140 transmits a request signal Sinq to the input/output module 110 through the front path switcher 161, receives set information Sans through the front path switcher 161, and sets the touch controller 150 through the back path switcher 162. Then, the front path switcher 161 switches to connect the input/output module 110 to the back path switcher 162, and the back path switcher 162 switches to connect the touch controller 150 to the front path switcher 161. The touch controller 150 transmits a control signal Scon to the input/output module 110 through the back path switcher 162 and the front path switcher 161.

Figure 8:
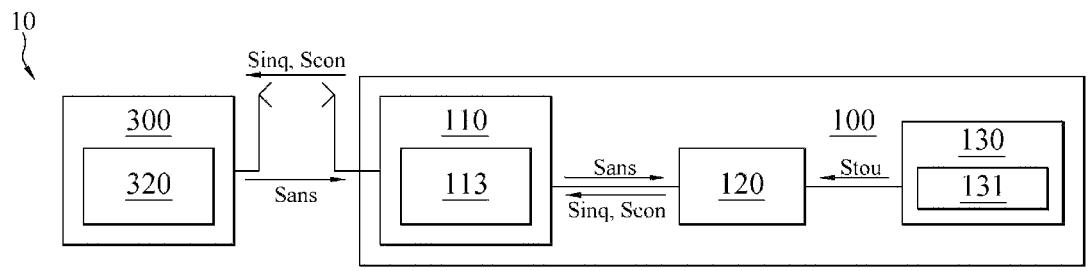
FIG. 8 is a schematic block diagram of an electronic device and a control system according to a seventh embodiment of the disclosure.

Referring to FIG. 8, the main difference between an electronic device 100 in FIG. 8 and the electronic device 100 in FIG. 1 is that the input/output module 110 of the electronic device 100 in FIG. 8 includes a wireless signal transceiver unit 113. For other same or similar components and connection relationships thereof, reference is made to the foregoing embodiments, and details will not be described herein again. In this embodiment, the input/output module 110 is connected to an external device 300 through the wireless signal transceiver unit 113 in a wireless communication manner (such as Wi-Fi, Bluetooth, or near field communication). In this way, the electronic device 100 is connected to the external device 300 without a transmission cable 310, making it more convenient in use.

Figure 9:
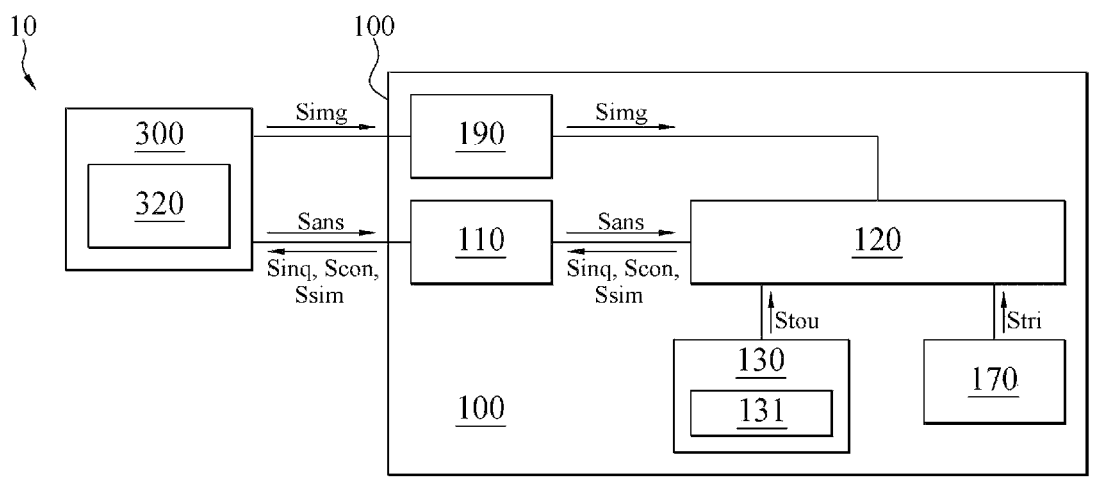
FIG. 9 is a schematic block diagram of an electronic device and a control system according to an eighth embodiment of the disclosure.

Referring to FIG. 9, one of the main differences between an electronic device 100 in FIG. 9 and the electronic device 100 in FIG. 1 is that the electronic device 100 in FIG. 9 further includes an audio/video signal module 190. For other same or similar components and connection relationships thereof, reference is made to the foregoing embodiments, and details will not be described herein again. In this embodiment, the touch display area 131 of the electronic device 100 is electrically connected to the control module 120, the control module 120 is electrically connected to the audio/video signal module 190, and the audio/video signal module 190 is connected to an external device 300. As shown in FIG. 2 and FIG. 9, in this embodiment, the audio/video signal module 190 and the input/output module 110 are connected to a same interface of the external device 300 through a same transmission cable 310. In an embodiment, the transmission cable 310 is compliant with the universal serial bus type-C (USB-C) specification, and the electronic device 100 and the external device 300 output and receive audio/video signals, control signals, and electric power through the transmission cable 310. In other embodiments, the audio/video signal module 190 and the input/output module 110 are respectively connected to different interfaces of the external device 300 through different transmission cables. In this embodiment, when the electronic device 100 is connected to the external device 300, the external device 300 outputs an image signal Simg to the audio/video signal module 190, the audio/video signal module 190 receives the image signal Simg and transmits the image signal Simg to the control module 120, and the control module 120 controls the touch display area 131 to display an adjusted image based on the image signal Simg.

In some embodiments, the external device 300 includes a particular function key. In an embodiment, the external device 300 is a smart phone using an Android operating system, and includes three particular function keys such as a return key, a home key, and a menu key. The particular function keys correspond to a virtual-key image in the external device 300. When the electronic device 100 is connected to the external device 300, the adjusted image displayed in the touch display area 131 of the electronic device 100 also includes a virtual-key image corresponding to the particular function keys, so that the user triggers a function of the return key, the home key, or the menu key in the external device 300 by touching the virtual-key image displayed in the touch display area 131 of the electronic device 100.

In an embodiment, physical keys corresponding to the particular function keys including the return key, the home key, and the menu key in the external device 300 are disposed on the electronic device 100. The user triggers functions of the particular function keys in the external device 300 by pressing the physical keys.

As shown in FIG. 9, in this embodiment, the electronic device 100 further includes a virtual-key trigger key 170. The virtual-key trigger key 170 is electrically connected to the control module 120, and the virtual-key trigger key 170 is a physical key disposed on a housing of the electronic device 100 or a virtual key disposed in an on screen display (OSD) of the electronic device 100. When the user presses, touches, or selects the virtual-key trigger key 170, the virtual-key trigger key 170 generates a trigger signal Stri and transmits the trigger signal Stri to the control module 120. The control module 120 generates a virtual-key signal Ssim based on the trigger signal Stri, and the input/output module 110 outputs the virtual-key signal Ssim to the external device 300. When the external device 300 receives the virtual-key signal Ssim, the external device 300 generates a virtual-key image based on the virtual-key signal Ssim, and a display area 330 of the external device 300 also displays the virtual-key image. That is, the virtual-key image is overlaid on an initial image that is being displayed in the display area 330 of the external device 300. The virtual-key image simulates the particular function key, and the virtual key image receives touch operations of the user.

Referring to FIG. 9 and FIG. 10, when the virtual-key image is overlaid on the initial image of the display area 330 of the external device 300, the external device 300 transmits the image signal Simg generated subsequently to the audio/video signal module 190 of the electronic device 100, and the audio/video signal module 190 transmits the image signal Simg to the control module 120. Then, the control module 120 controls the touch display area 131 to display an adjusted image 201 based on the image signal Simg. As shown in FIG. 10, the adjusted image 201 also includes an overlaid virtual-key image 202. When the user touches the virtual-key image 202 in the touch display area 131, the touch screen 130 of the electronic device 100 generates a corresponding touch signal Stou and transmits the touch signal Stou to the control module 120. The control module 120 generates a control signal Scon based on the touch signal Stou, and transmits the control signal Scon to the external device 300 through the input/output module 110. The external device 300 performs the function of the corresponding particular function key based on the control signal Scon.

Figure 11:
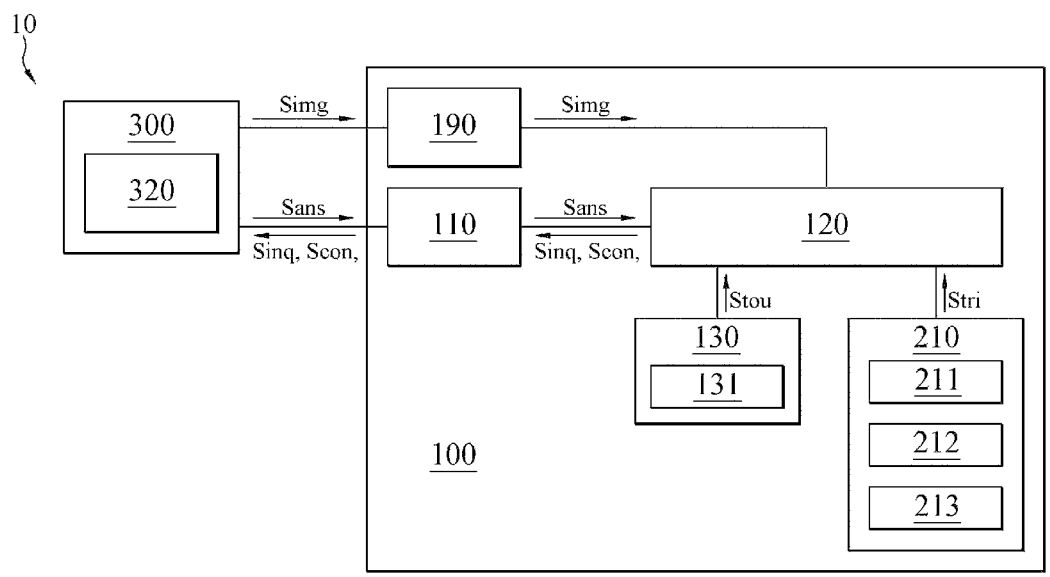
FIG. 11 is a schematic block diagram of an electronic device and a control system according to a ninth embodiment of the disclosure.
Figure 12:
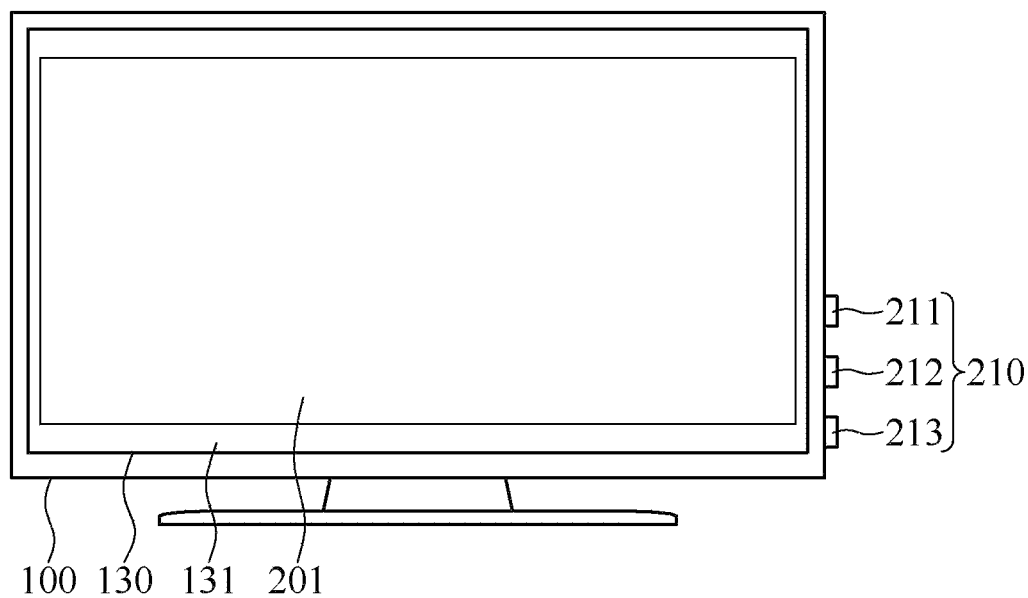
FIG. 12 is a schematic diagram of an implementation aspect of the electronic device in FIG. 11.

Referring to FIG. 11 and FIG. 12, the difference between an electronic device 100 in FIG. 11 and the electronic device 100 in FIG. 9 is that the virtual-key image 202 displayed in the touch display area 131 in FIG. 9 and FIG. 10 is replaced with physical keys 210 in FIG. 11. For other same or similar components and connection relationships thereof, reference is made to the foregoing embodiments, and details will not be described herein again. As shown in FIG. 11 and FIG. 12, in this embodiment, the physical keys 210 are a physical press keys disposed at an edge of a housing of the electronic device 100, and including a first key 211, a second key 212, and a third key 213. The first key 211, the second key 212, and the third key 213 respectively correspond to a return key, a home key, and a menu key of the Android operating system. In other embodiments, the physical keys 210 include other keys corresponding to particular function keys of other types of operating systems. As shown in FIG. 11 and FIG. 12, in this embodiment, functions of the physical keys 210 are similar to those of the virtual-key image 202 displayed in the touch display area 131 in FIG. 9 and FIG. 10. When the user presses the first key 211, the second key 212, or the third key 213, the first key 211, the second key 212, or the third key 213 generates a corresponding trigger signal Stri. The control module 120 generates a corresponding control signal Scon based on the trigger signal Stri, and the input/output module 110 outputs the control signal Scon to the external device 300. The external device 300 performs the function of the corresponding particular function key based on the control signal Scon.

Figure 13:
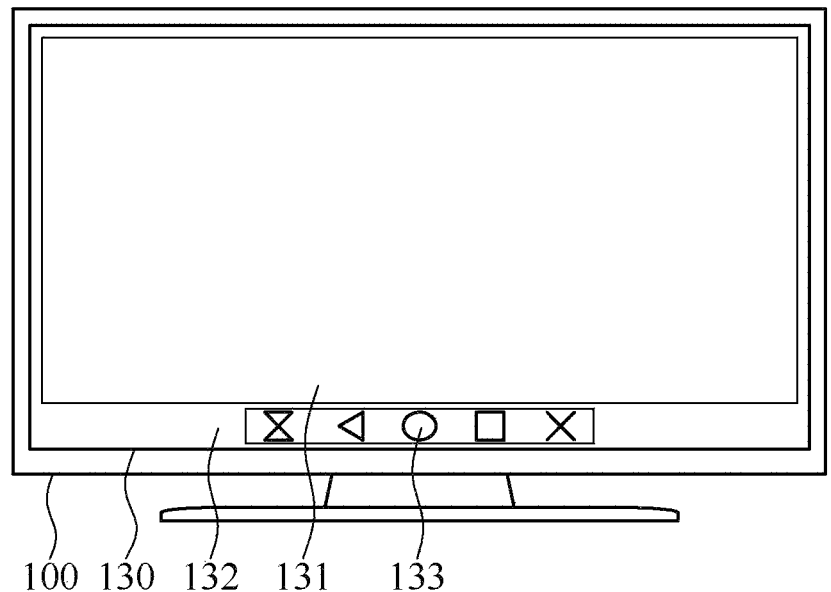
FIG. 13 is a schematic diagram of another implementation aspect of the electronic device in FIG. 11.

Referring to FIG. 11 and FIG. 13, functions of physical keys 133 in FIG. 13 are similar to those of the physical keys 210 in FIG. 12. The difference between FIG. 13 and FIG. 12 is that the touch screen 130 further includes a touch area 132 and physical keys 133. The touch area 132 surrounds a periphery of the touch display area 131. The touch display area 131 displays an image and senses a touch behavior. The touch area 132 only senses a touch behavior and does not display any image. The physical keys 133 are formed in the touch area 132 by printing or ink jetting, and a user touches the physical key 133 located in the touch area 132 to trigger the physical key 133 in a touch manner. When the user touches the physical key 133 in the touch area 132, the touch screen 130 generates a corresponding trigger signal Stri. The control module 120 generates a corresponding the control signal Scon based on the trigger signal Stri, and the input/output module 110 outputs the control signal Scon to the external device 300. The external device 300 performs the function of the corresponding particular function key based on the control signal Scon.

Figure 14:
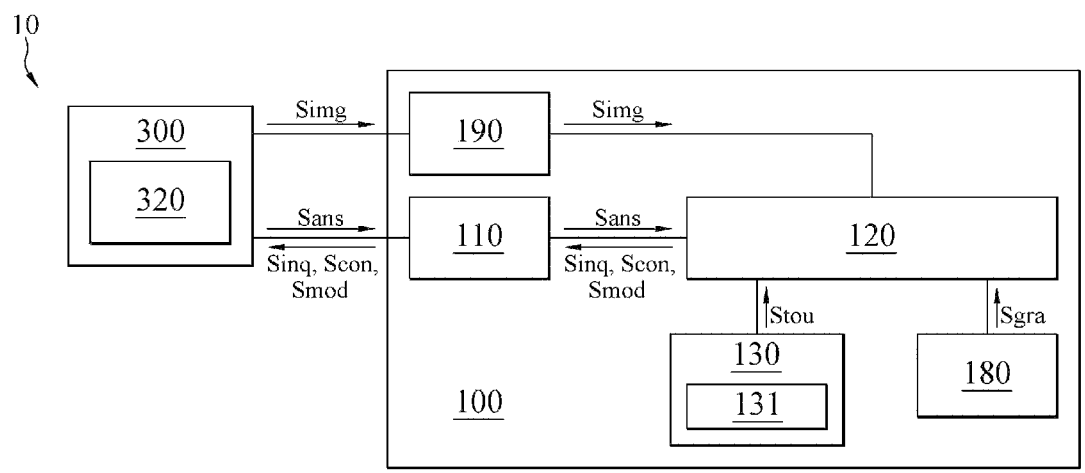
FIG. 14 is a schematic block diagram of an electronic device and a control system according to a tenth embodiment of the disclosure.

Referring to FIG. 14, in this embodiment, the electronic device 100 further includes a gravity sensor 180. The gravity sensor 180 is electrically connected to the control module 120, and is configured to sense a directionality of the electronic device 100 based on the gravity to correspondingly switch an image displayed in a touch display area 131 to a vertical mode or a horizontal mode. In an embodiment, when the electronic device 100 is connected to an external device 300 and an image displayed in a display area 330 of the external device 300 is in a first mode (such as the vertical mode), an adjusted image 201 displayed in the touch display area 131 is also in the first mode. In this case, when the user rotates the electronic device 100 by an angle (which is 90 degrees in an embodiment), the gravity sensor 180 generates a sensing signal Sgra. The control module 120 generates an image-mode switching signal Smod based on the sensing signal Sgra, and the input/output module 110 outputs the image-mode switching signal Smod to the external device 300. When the external device 300 receives the image-mode switching signal Smod, the external device 300 switches the image from the first mode (vertical mode) to a second mode (horizontal mode), and outputs an image signal Simg corresponding to the second mode to the electronic device 100. Corresponding to the external device 300, the adjusted image 201 displayed in the touch display area 131 of the electronic device 100 is synchronously switched to the second mode based on the image signal Simg. That is, the user controls the external device 300 to correspondingly switch the image mode by simply rotating the electronic device 100.

Figure 15:
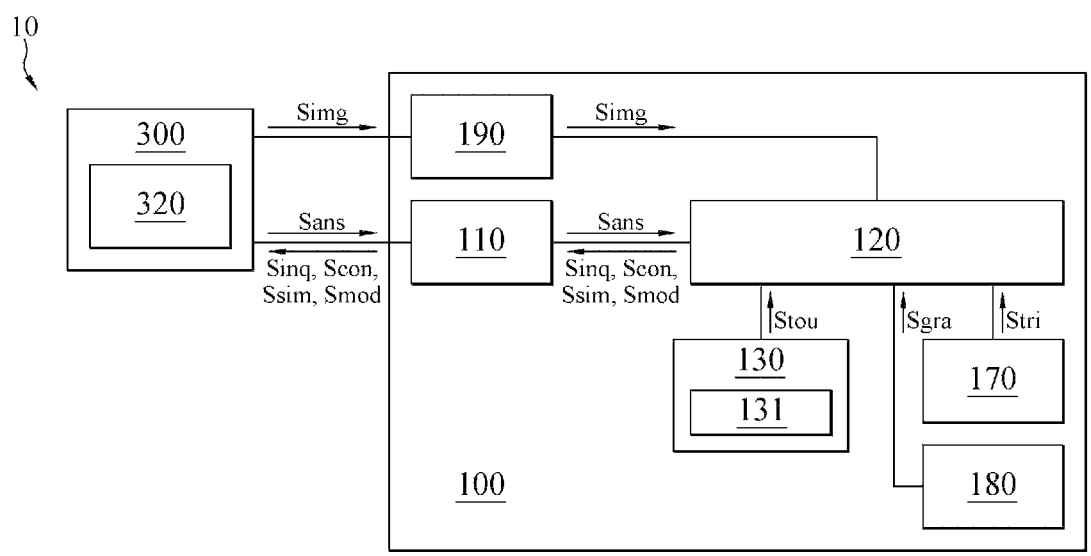
FIG. 15 is a schematic block diagram of an electronic device and a control system according to an eleventh embodiment of the disclosure.

Referring to FIG. 15, an electronic device 100 in FIG. 15 is a combination of the electronic devices 100 in FIG. 9 and FIG. 14. In this embodiment, the electronic device 100 includes a virtual-key trigger key 170 and a gravity sensor 180. The virtual-key trigger key 170 and the gravity sensor 180 are electrically connected to the control module 120 respectively. The virtual-key trigger key 170 generates a trigger signal Stri and outputs the trigger signal Stri to the control module 120, the control module 120 generates a virtual-key signal Ssim based on the trigger signal Stri, the input/output module 110 outputs the virtual-key signal Ssim to an external device 300, and the external device 300 generates a virtual-key image based on the virtual-key signal Ssim. Correspondingly, as shown in FIG. 10, the touch display area 131 of the electronic device 100 displays the virtual-key image 202, and when the user touches the virtual-key image 202, the external device 300 performs the function of the corresponding particular function key. In addition, the gravity sensor 180 generates a sensing signal Sgra, the control module 120 generates an image-mode switching signal Smod based on the sensing signal Sgra, and the input/output module 110 outputs the image-mode switching signal Smod to the external device 300. The external device 300 switches the image mode based on the image-mode switching signal Smod, and the adjusted image 201 displayed in the touch display area 131 of the electronic device 100 is synchronously switched.

Based on the above, when the electronic device in the embodiments of the disclosure is connected to an external device, the electronic device automatically analyzes touch information and an image specification of a touch screen of the connected external device, and generates corresponding conversion information, to enable a reference coordinate system of the touch screen of the electronic device to correctly correspond to a reference coordinate system of the touch screen of the external device. Therefore, a position that a user touches on the electronic device correctly corresponds to the external device, thereby preventing the external device from performing an incorrect or invalid operation. Moreover, the user uses particular function keys of the external device by means of the electronic device of the disclosure. In addition, the user controls, through the electronic device, the external device to correspondingly switch the image mode without touching the external device. Thereby, the user operates the external device more accurately and conveniently through the electronic device.

The above-described embodiments and/or implementations are merely illustrative of preferred embodiments and/or implementations for practicing the techniques of the disclosure, and are not intended to limit the embodiments of the techniques of the disclosure in any manner, and any person skilled in the art may make various variations or modifications to obtain other equivalent embodiments without departing from the scope of the technical means disclosed herein, and all such embodiments should still be considered to be substantially the same techniques or embodiments as the disclosure.

What is claimed is:

1. An electronic device, adapted to connect to an external device, and comprising:
an input/output module;
a control module, electrically connected with the input/output module, wherein the control module is configured to output a request signal through the input/output module and receive set information corresponding to the request signal through the input/output module;
a touch screen, electrically connected with the control module, the touch screen further comprises a touch display area, wherein when the touch screen generates a touch signal in response to a touch behavior, the control module converts the touch signal to a control signal based on the set information, and outputs the control signal through the input/output module;
a virtual-key trigger key, electrically connected with the control module; and
an audio/video signal module, electrically connected to control module, the audio/video signal module receives an image signal from the external device when the input/output module outputs a virtual-key signal to the external device, the control module controls the touch display area to display an adjusted image based on the image signal, and the adjusted image comprises a virtual-key image;
wherein the set information comprises touch information and an image specification.

2. The electronic device according to claim 1, wherein the control module further comprises a primary controller and a touch controller, the primary controller is electrically connected to the touch controller and the input/output module, the touch controller is electrically connected to the touch screen, the primary controller generates the request signal, and the touch controller converts the touch signal to the control signal.

3. The electronic device according to claim 2, further comprising: a front path switcher, wherein the touch controller further comprises a first touch control interface and a second touch control interface, the input/output module is connected with the front path switcher, the front path switcher is configured to selectively connect the input/output module to the first touch control interface or the primary controller, and the primary controller is connected with the second touch control interface.

4. The electronic device according to claim 2, further comprising: a back path switcher, wherein the input/output module comprises a first input/output interface and a second input/output interface, the touch controller is connected with the back path switcher, the back path switcher is configured to selectively connect the touch controller to the first input/output interface or the primary controller, and the primary controller is connected with the second input/output interface.

5. The electronic device according to claim 2, further comprising: a front path switcher and a back path switcher, wherein the front path switcher selectively connects the input/output module to the back path switcher or the primary controller, and the back path switcher selectively connects the touch controller to the front path switcher or the primary controller.

6. The electronic device according to claim 2, wherein the input/output module comprises a first input/output interface and a second input/output interface, the touch controller further comprises a first touch control interface and a second touch control interface, the first input/output interface is connected with the first touch control interface, and the primary controller is connected with the second input/output interface and the second touch control interface.

7. The electronic device according to claim 1, wherein the touch signal comprises first coordinate information, the control module converts the first coordinate information to second coordinate information, and the control signal comprises the second coordinate information.

8. The electronic device according to claim 1, wherein the input/output module comprises a wireless signal transceiver.

9. The electronic device according to claim 1, further comprising: a gravity sensor, wherein the gravity sensor is electrically connected with the control module.

10. An electronic device, adapted to connect to an external device, and comprising:
an input/output module;

a control module, electrically connected with the input/output module, wherein the control module is configured to output a request signal through the input/output module and receive set information corresponding to the request signal through the input/output module;

a touch screen, electrically connected with the control module, wherein when the touch screen generates a touch signal in response to a touch behavior, the control module converts the touch signal to a control signal based on the set information, and outputs the control signal through the input/output module; and a back path switcher;

wherein the control module further comprises a primary controller and a touch controller, the primary controller is electrically connected to the touch controller and the input/output module, the touch controller is electrically connected to the touch screen and the back path switcher, the primary controller generates the request signal, and the touch controller converts the touch signal to the control signal; and wherein the input/output module comprises a first input/output interface and a second input/output interface, the back path switcher is configured to selectively connect the touch controller to the first input/output interface or the primary controller, and the primary controller is connected with the second input/output interface.

11. An electronic device, adapted to connect to an external device, and comprising:

an input/output module;

a control module, electrically connected with the input/output module, wherein the control module is configured to output a request signal through the input/output module and receive set information corresponding to the request signal through the input/output module;

a touch screen, electrically connected with the control module, the touch screen comprises a touch display area, wherein when the touch screen generates a touch signal in response to a touch behavior, the control module converts the touch signal to a control signal based on the set information, and outputs the control signal through the input/output module;

a virtual-key trigger key, electrically connected with the control module; and an audio/video signal module, electrically connected to the control module, the audio/video signal module receives an image signal from the external device when the input/output module outputs a virtual-key signal to the external device, the control module controls the touch display area to display an adjusted image based on the image signal, and the adjusted image comprises a virtual-key image.

* * * * *